United States Patent
Chung et al.

(10) Patent No.: US 11,327,973 B2
(45) Date of Patent: May 10, 2022

(54) CRITICAL PATH ANALYSIS OF ACTIVITY TRACE FILES

(71) Applicant: INTERNATIONAL BUSINESS MACHINES CORPORATION, Armonk, NY (US)

(72) Inventors: I-Hsin Chung, Chappaqua, NY (US); Jinjun Xiong, Goldens Bridge, NY (US); Carl Pearson, Urbana, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 16/751,317

(22) Filed: Jan. 24, 2020

(65) Prior Publication Data
US 2021/0232584 A1 Jul. 29, 2021

(51) Int. Cl.
G06F 11/00 (2006.01)
G06F 16/2455 (2019.01)
G06F 11/34 (2006.01)
G06F 11/30 (2006.01)

(52) U.S. Cl.
CPC ...... *G06F 16/24553* (2019.01); *G06F 11/302* (2013.01); *G06F 11/3006* (2013.01); *G06F 11/3495* (2013.01)

(58) Field of Classification Search
CPC ............ G06F 11/3466; G06F 11/3419; G06F 11/3476
See application file for complete search history.

(56) References Cited

U.S. PATENT DOCUMENTS

| 8,850,172 | B2 | 9/2014 | Dietrict et al. | |
|---|---|---|---|---|
| 9,405,654 | B2 | 8/2016 | Sivalingam et al. | |
| 9,792,231 | B1 | 10/2017 | Thompson et al. | |
| 2009/0241096 | A1* | 9/2009 | Borghetti | G06F 11/3636 717/128 |
| 2014/0380282 | A1* | 12/2014 | Ravindranath Sivalingam | G06F 11/3644 717/128 |
| 2017/0250890 | A1* | 8/2017 | Puls | H04L 67/02 |

OTHER PUBLICATIONS

Thiem et al.; "Planning Uncertainties Survey of Techniques"; IPCOM000219823D; IPCOM Publication Date Jul. 17, 2012; 2012, KBR (Kellogg Brown &Root, LLC); (26 Pages).
"Interactive Predecessor Mapping and Analysis in Projected Plans"; IPCOM000226475D; IPCOM Publication Date Apr. 4, 2013; (4 Pages).
"Critical Path Coverage Determination Through Back Annotated Netlist Functional Simulations"; IPCOM000229667D; IPCOM Publication Date Aug. 6, 2013; (9 Pages).
Gunter, JE.; "Implementation of Critical Path Method and Critical Resource Diagramming Using Arena Simulation Software"; (96 Pages).
Rider, RJ.; "Consideration for Identifying and Analyzing the Critical Path"; (18 Pages).
Alexander, CA. et al.; "Near-Critical Path Analysis: a Tool for Parallel, Program Optimization"; (11 Pages).

\* cited by examiner

*Primary Examiner* — Charles Ehne
(74) *Attorney, Agent, or Firm* — Griffiths & Seaton PLLC

(57) ABSTRACT

Embodiments for providing critical path analysis of active trace files in a cloud computing environment. A critical path may be identified using a trace of time spans and activities of a plurality of applications, wherein the critical path is a set of activities having time spans free of overlap with other activities.

20 Claims, 12 Drawing Sheets

CRITICAL PATH ANALYSIS OF ACTIVITY TRACE FILES

BACKGROUND OF THE INVENTION

Field of the Invention

The present invention relates in general to computing systems, and more particularly to, various embodiments providing critical path analysis of active trace files in a computing environment.

Description of the Related Art

Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computer systems. For example, processing devices, with the advent and further miniaturization of integrated circuits, have made it possible to be integrated into a wide variety of devices. As the amount of information to be processed increases greatly, processing, storing, and/or retrieving various amounts of information is a key problem to solve. As great strides and advances in technologies come to fruition, these technological advances can be then brought to bear in everyday life.

SUMMARY OF THE INVENTION

Various embodiments for providing critical path analysis of active trace files in a computing environment are provided. In one embodiment, by way of example only, a method for providing critical path analysis of active trace files, again by a processor, is provided. A critical path may be identified using a trace of time spans and activities of a plurality of applications, wherein the critical path is a set of activities having time spans free of overlap with other activities.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
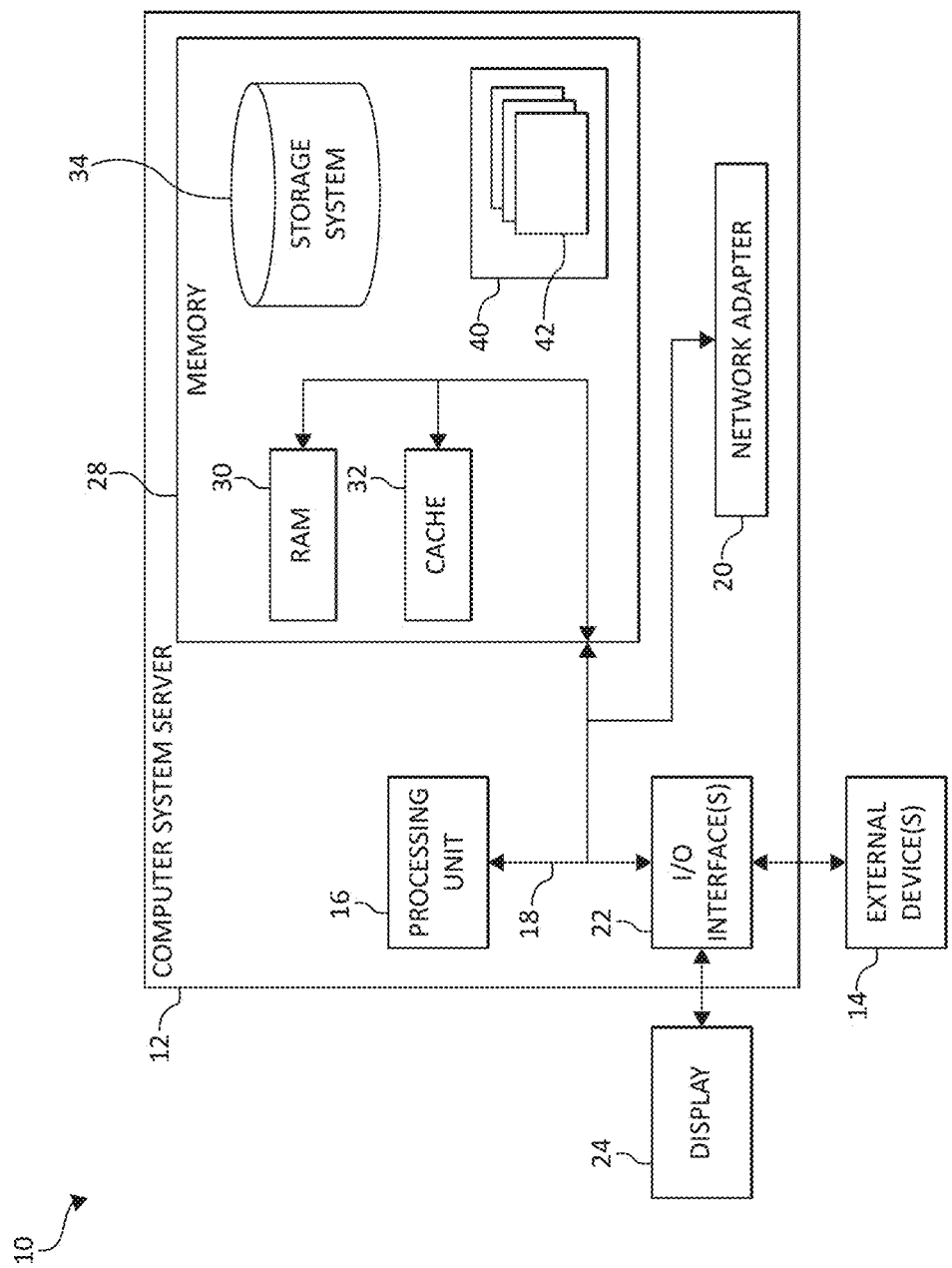
FIG. 1 is a block diagram depicting an exemplary computing node according to an embodiment of the present invention.

In computing systems, application performance tools can help by monitoring a program's execution and producing performance data that can be analyzed to locate and understand areas of poor performance. One common way of monitoring a program's behavior is to generate trace events while executing the program. Trace data collected during program execution may then be used for debugging, visualization, and understanding the program's behavior. Conventional performance analysis tools (e.g., an application programming tool) usually record performance information, which may be pre-defined by the tool developers.

Application tracing tools may report application execution and record time-spans for various activities into files that may be analyzed later. However, such approaches commonly suffer from two problems. First, the memory usage of analysis increases with the size of the trace. For large traces, commonly generated from real-life application runs, the tools frequently require more memory than the system has available. Second, the results provided by the analysis tools do not isolate activities that are on a critical path, if the critical path is not explicitly recorded during the trace. For example, the tracing tool can tell you how much time a graphics processor unit ("GPU") kernel took, but not whether or not the execution time of that kernel affected the application execution. Thus, the overhead of the information collection activities in a performance analysis tool can dominate the system resource usage (e.g., memory used for tracing). These overheads can make the performance analysis tools impractical (e.g., too much memory space required for detailed tracing). Even if the system has sufficient resources to handle these issues, it will be difficult to analyze and determine activities on the critical path.

Accordingly, the present invention provides a novel solution for providing critical path analysis of active trace files in a computing environment are provided. In one embodiment, by way of example only, a critical path may be identified using a trace of time spans and activities of a plurality of applications, wherein the critical path is a set of activities having time spans free of overlap with other activities.

In an additional aspect, the various mechanisms of the illustrated embodiments provide for effective and efficient operations to identify critical path. In one aspect, a tracing operation is executed. The tracing operation (e.g., a "trace") may record various activity time spans such as, for example, one or more overlapping and/or non-overlapping activity time spans. The trace may include one or more time spans from multiple parallel activities. The critical path may be a set of activities that do not overlap with any other activities in the record. The record may be produced by a) observing a computer program while it executes, b) executing a computer application modified to produce the record during execution, and/or c) simulating and recording activities through some other means.

In one aspect, operations for trace processing may include 1) consuming a file that contains a record, b) progressing through the trace in order of time spans, tracking sets of spans that are active at each time step to discover, which time spans are on the critical path and has memory usage proportional to the types of activities as compared to the number of activity time spans.

Thus, the present invention may quantitatively analyze the performance of application traces generated by realistic program executions and makes the application analysis more useful by reporting how activities affect application execution time, instead of just analyzing the activities themselves. The present invention may detect non-constant memory use and may be accomplished by running potentially infringing tools on record files and observing their memory usage.

That is, the present invention provides for determining an upper bound of performance improvement in a program under test ("PUT") by focusing attention on particular application areas. The upper bound of performance improvement means that an amount of performance improvement is determined that cannot be exceeded (e.g., application does not change regardless of how much the execution time of the particular application area is reduced). A trace record may be provided (e.g., provided as input) that includes temporal activity spans for specific application components. Also, a user-defined specification (e.g., provided as input) may be provided for compound components, whose activity depends on whether components in the trace record are active. In operation, the activity value of the compound components may be evaluated at every edge of a time span in the trace record. The activity values may be summarized.

In one aspect, the trace record represents the activity of a computer system components and interconnects (e.g., components that connects to other components such as, for example, a bus, etc.). The user-defined compound components may be represented as an expression (e.g., a Boolean algebraic expressions) of the user-defined compound components (e.g., user-defined compound components).

In an additional aspect, the activity associated with a user-defined compound component can be determined by evaluating a Boolean expression at each edge of each time span. The time span edges may be in temporal order.

In an additional aspect, the one user-defined component may be created in the trace record for each real component and represents a time when only that real component is active. Also, the summary (e.g., summary of the activity values of the compound components) may be presented as a proportion of program time where the user-defined components were active and the total active time of a compound component may represent an upper bound of the possible program time reduction by optimizing the performance of that component.

In an additional aspect, the traces may be produced using, for example, a command-line light weight graphical user interface-less profilers such as, for example, an Nvidia Profiler ("nvprof") to record activity for each component (e.g., a central processing unit "CPU" or graphics processing unit "GPU"), and each CPU-to-GPU transfer (component). The traces may be stored in a database. The trace edges may be analyzed in temporal order after being sorted in the database. User-defined components may be represented as expression trees of Boolean algebra. The user-defined components may be evaluated whenever an edge from one of their input components is processed.

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

Other examples of various aspects of the illustrated embodiments, and corresponding benefits, will be described further herein.

It is understood in advance that although this disclosure includes a detailed description on computing systems such as, for example, cloud computing, implementation of the teachings recited herein are not limited or restricted to any particular computing environment. Rather, embodiments of the present invention are capable of being implemented in conjunction with any other type of computing environment now known or later developed such as, for example, cloud computing.

For example, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
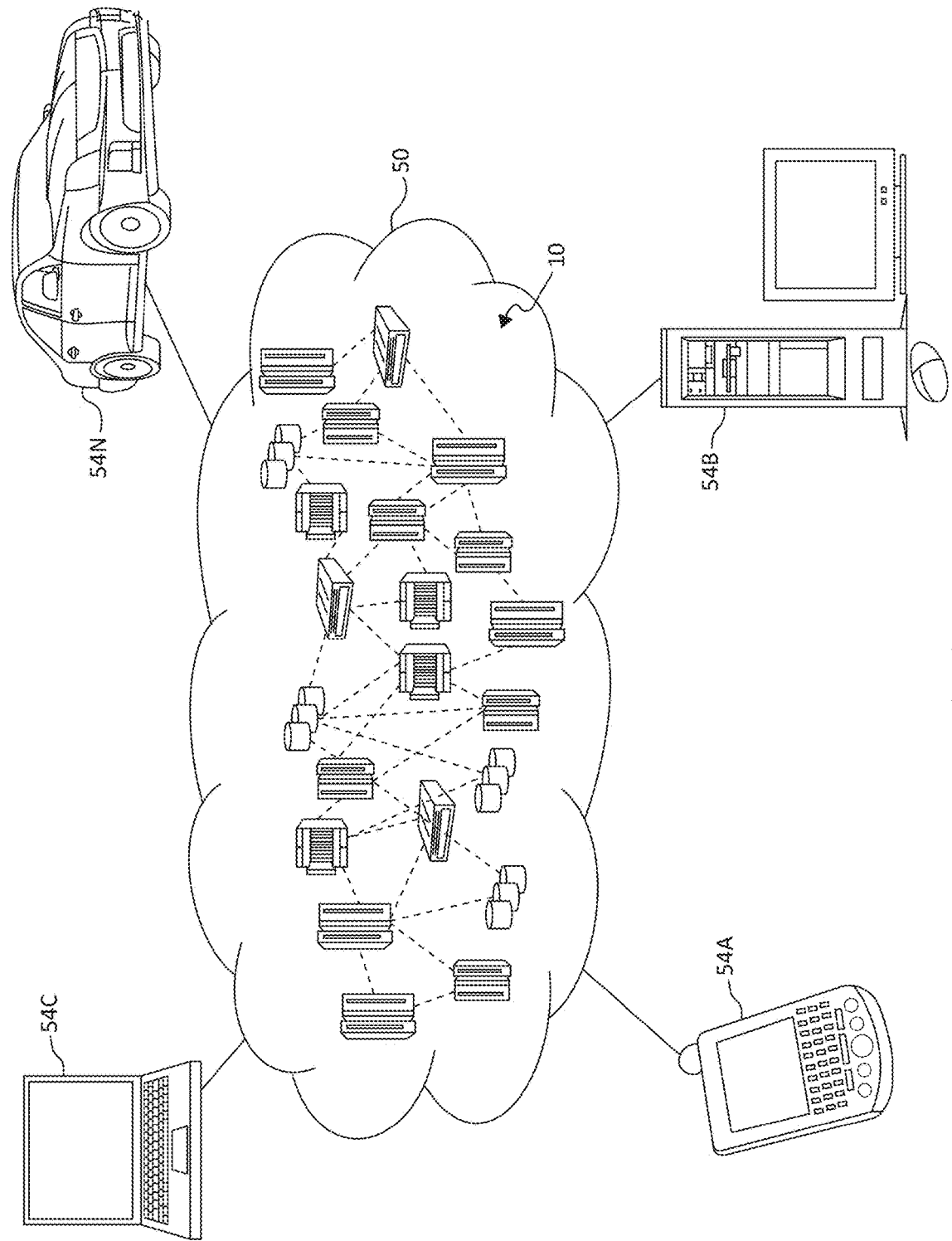
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, an intelligent ("smart") device 54D, and/or automobile computer system 54N may communicate. As used herein, a mattress such as, for example device 5D may be any computing system to enable to various mechanisms of the illustrative embodiments.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
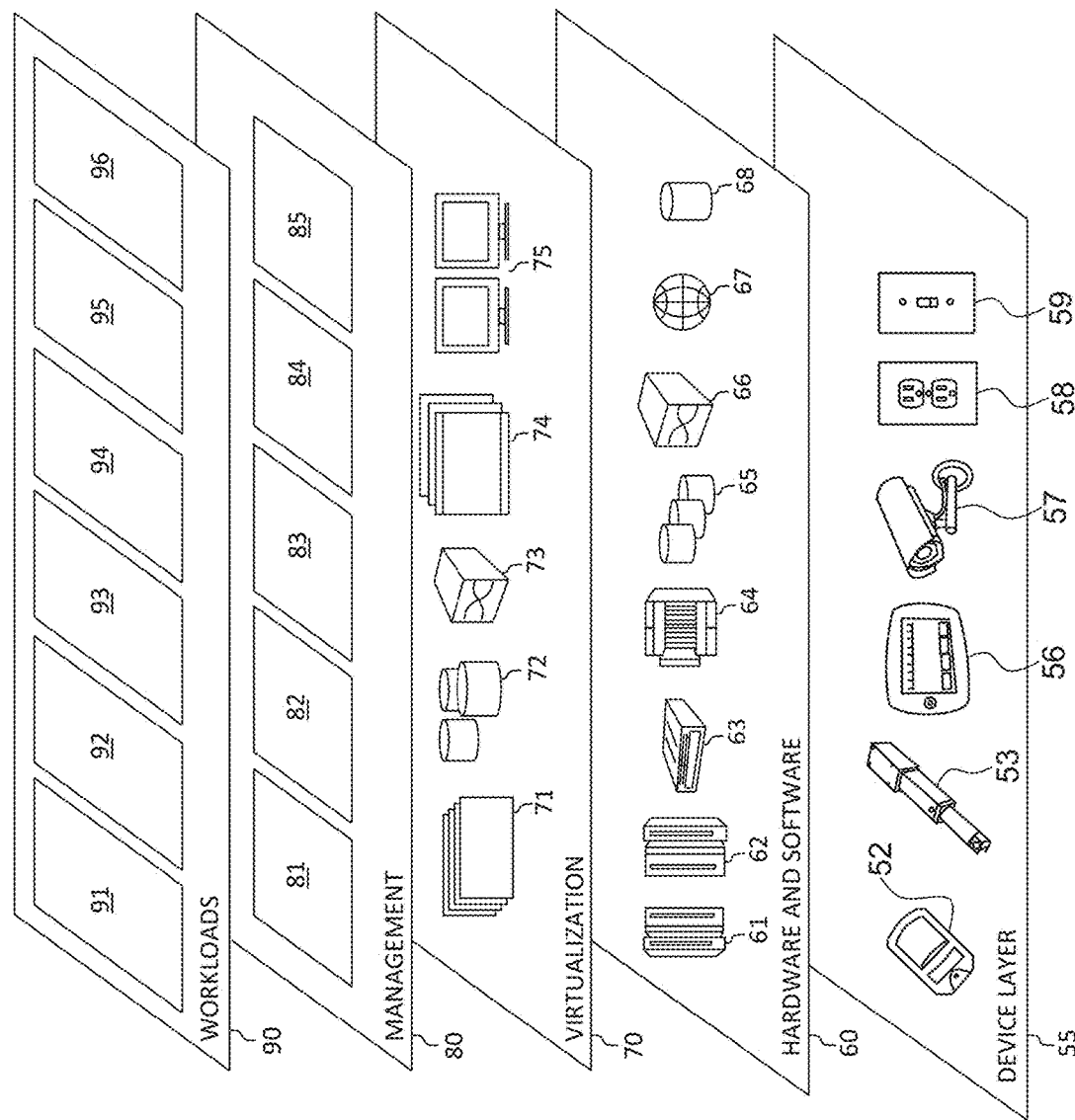
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74;

and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various workloads and functions 96 for providing critical path analysis of active trace files. In addition, configuring settings for various workloads and functions 96 for providing critical path analysis of active trace files may include such operations as data analysis (including data collection and processing from various environmental sensors), networking, sending/receiving data, providing virtualization/virtual compute, encryptions, cloud computing communications, and/or management functions. One of ordinary skill in the art will appreciate that the configuring settings for various computer-controlled devices using workloads and functions 96 for providing critical path analysis of active trace files may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the present invention provide a novel approach for providing critical path analysis of active trace files. A critical path may be identified using a trace of time spans and activities of a plurality of applications, wherein the critical path is a set of activities having time spans free of overlap with other activities.

Figure 4:
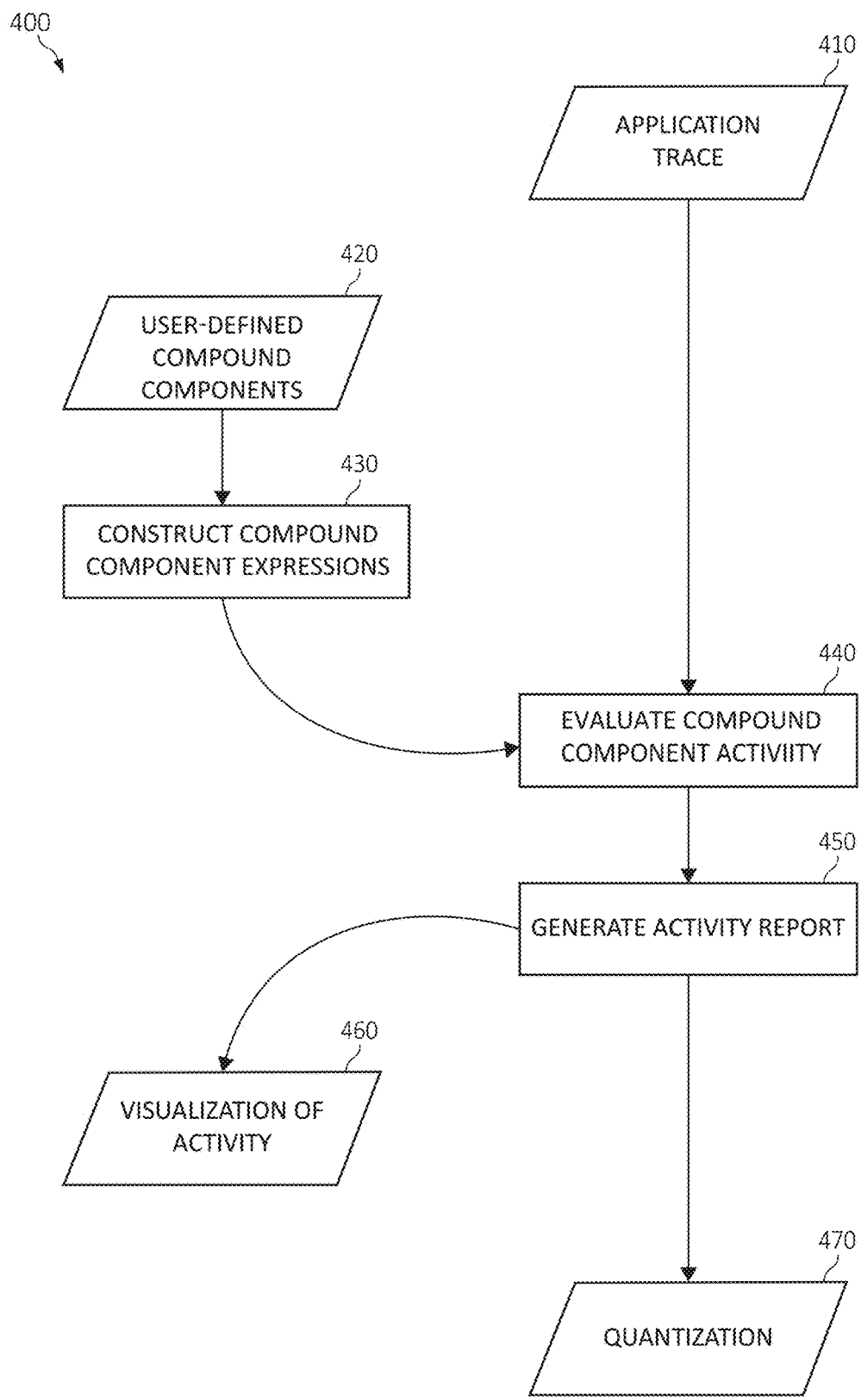
FIG. 4 is a flowchart diagram depicting an exemplary method for providing critical path analysis of active trace files in a computing environment in accordance with aspects of the present invention.

Turning now to FIG. 4, a method 400 for providing critical path analysis of active trace files in a computing environment is depicted. In one aspect, each of the devices, components, modules, operations, and/or functions described in FIGS. 1-3 also may apply or perform one or more operations or actions of FIG. 4. The functionality 400 may be implemented as a method executed as instructions on a machine, where the instructions are included on at least one computer readable medium or one non-transitory machine-readable storage medium.

The functionality 400 may start in block 410 by execute and provide as "input" a trace of application that may be generated and recorded. The trace may include one or more different components of the application and one or more time-spans for each part defining when that part is active.

As indicated in block 420 (in a processing operation), a user may define (e.g., user-defined "UD") compound components (and provided as "input") in terms of combinations of the different components. The definition of the UD compound components may be provided (and driven) by the user's specific performance analysis goals. One or more compound components expressions may be constructed, as in block 430, such as, for example, the UD compound components may be expressed as definitions that may be represented as an expression (e.g., Boolean algebra expressions) in terms of the different application components.

In block 440 (in a processing operation), one or more compound component activities may be evaluated (and/or identified). In one aspect, in block 440, a starting edge (e.g., a starting point) and stopping edge (e.g., a stopping point) of every time span may be processed in temporal order. A UD compound component's activity value may be updated if it is affected by the compound component(s) that the span is associated with.

In block 450 (in a processing operation), an activity report may be generated. That is, one or more active/idle states of the UD compound components may be summarized to produce qualitative or quantitative outputs.

In block 460 (as output), a visualization of one or more activities may be provided (as output). That is, a timeline of user-defined activities may be visualized (e.g., visualized as output via a graphical user interface "GUI" or other means or visualization) alongside the application trace.

In block 470 (as output), a quantization operation may be performed. That is, a total active time of UD compound components, as compared to application components, may be used to evaluate an effect of optimizations and/or estimate a performance impact of optimizations. For example, assume there are two user-defined compound components: 1) the CPU is busy and no other component is busy, and 2) the GPU is busy and no other component is busy. After quantifying, it is discovered that 1) is 70% of the program time and 2) is 20%. The present invention may then decide to focus on optimizing the CPU part of the application, since the application program time may be reduced by 70%, whereas optimizing the GPU time would only reduce the application program time by at most 20%.

Turning now to FIGS. 5A-5D, depicts operations 500, 515, 525, and 535 for providing critical path analysis of active trace files in a computing environment. It should be noted that the descriptions and embodiments of FIGS. 1-4 can be used in FIG. 5A-5D. Repetitive description of like elements employed in other embodiments described herein (e.g., FIG. 4) is omitted for sake of brevity.

Figure 5A:
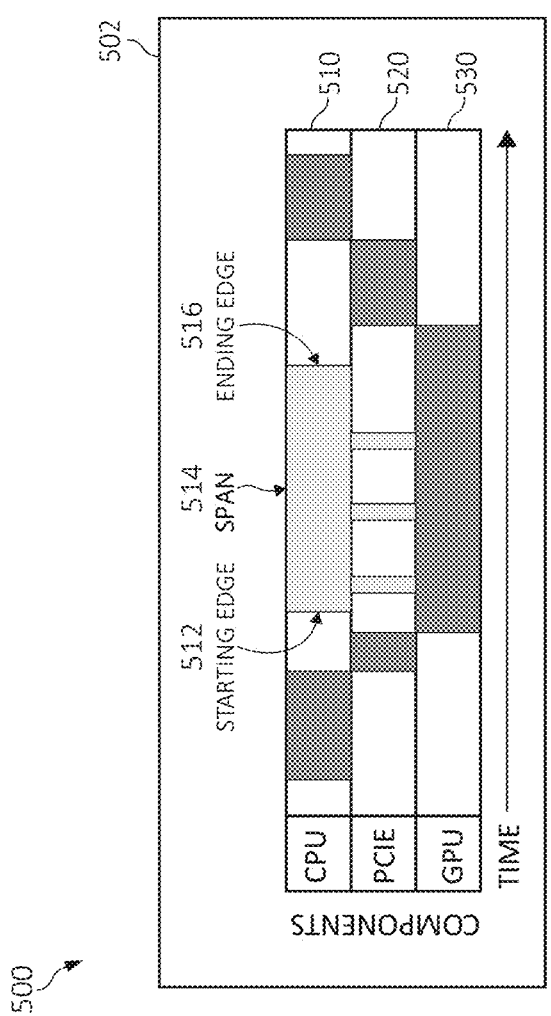
FIGS. 5A-5D are block diagram depicting additional exemplary operations for providing critical path analysis of active trace files in a computing environment in which aspects of the present invention may be realized.

Turning now to FIG. 5A, an annotated timeline with a definition of the critical path is depicted in diagram 500. (It should be noted, for illustration purposes only, the critical path in FIG. 5A are the darker shaded blocks of 510, 520, and 530). That is, in block 502, a trace of a recorded application (e.g., record 514) is depicted that includes one or more components such as, for example, a central processing unit ("CPU"), a peripheral component interconnect express ("PCIE"), and a graphics processing unit ("GPU") and one or more time spans. In one aspect, each component may refer to a particular component of the application such as, for example, an application component (e.g., a thread or function), or a hardware component (e.g., a CPU or disk). The activity timelines 510, 520, and 530 may each have a start time ("starting edge") and stop time ("ending edge"), and represent when a particular part of the application is active. Any of the time spans on the critical path may have the property that reducing its time by an infinitesimal amount "e" reduces the total execution time by e. Diagram 500 represents contents of a trace, but the trace does not require being recorded in a visual way. Also, the critical path does not indicate the effect of optimization efforts. Also, as depicted in FIG. 5A, it may be observed that even if the GPU is reduced, for example, by one half (e.g., "½"), then the application performance does not reduce by the same mount because of the middle CPU span would be unchanged and now be on the critical path. Thus, a specific component exposure may represent the true opportunity for optimizing that application component.

Figure 5B:
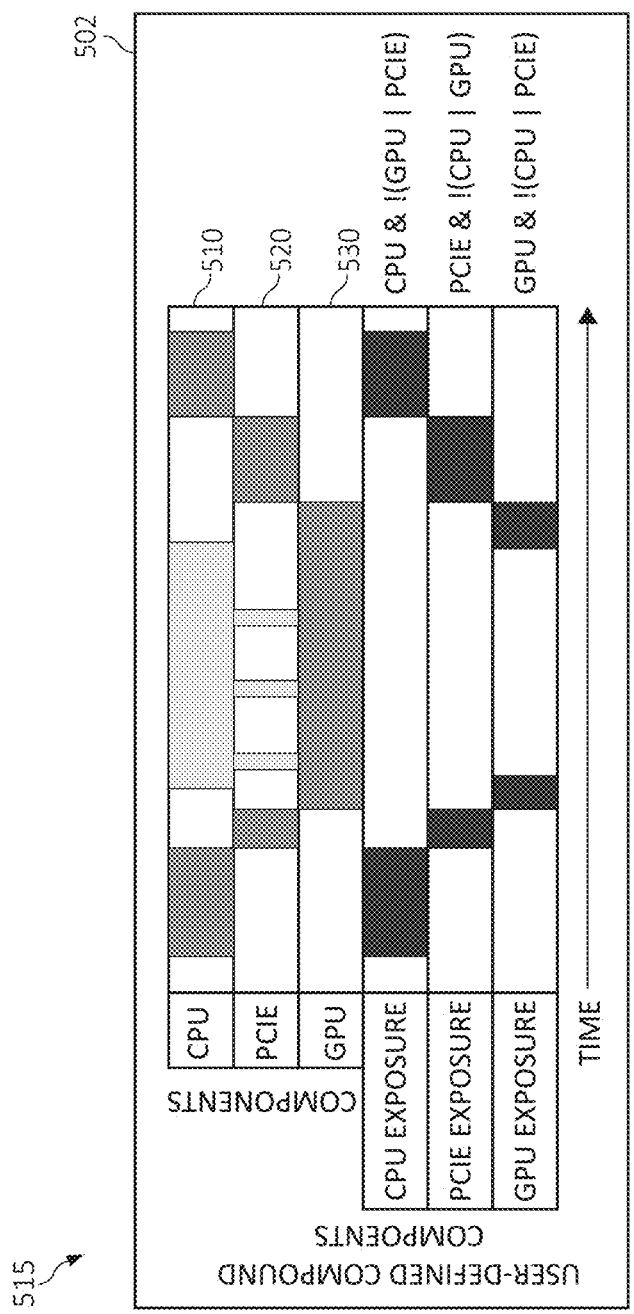

Accordingly, as depicted in FIG. 5B, the present invention may define one or more compound components corresponding to exposed time spans (e.g., CPU exposure, PCIE exposure, and GPU exposure) as time spans where no other component is active. These exposures may be considered as "compound components" in the sense that they may also be viewed as having multiple time spans associated with them. Each compound component exposure may be determined/computed through an expression (e.g., a Boolean algebraic expression such as, for example, CPU & !(GPU|PCIe), PCIe & !(CPU|GPU), GPU & ! (CPU|PCIe), applied to the recorded components of activity timelines 510, 520, and 530.

Figure 5C:
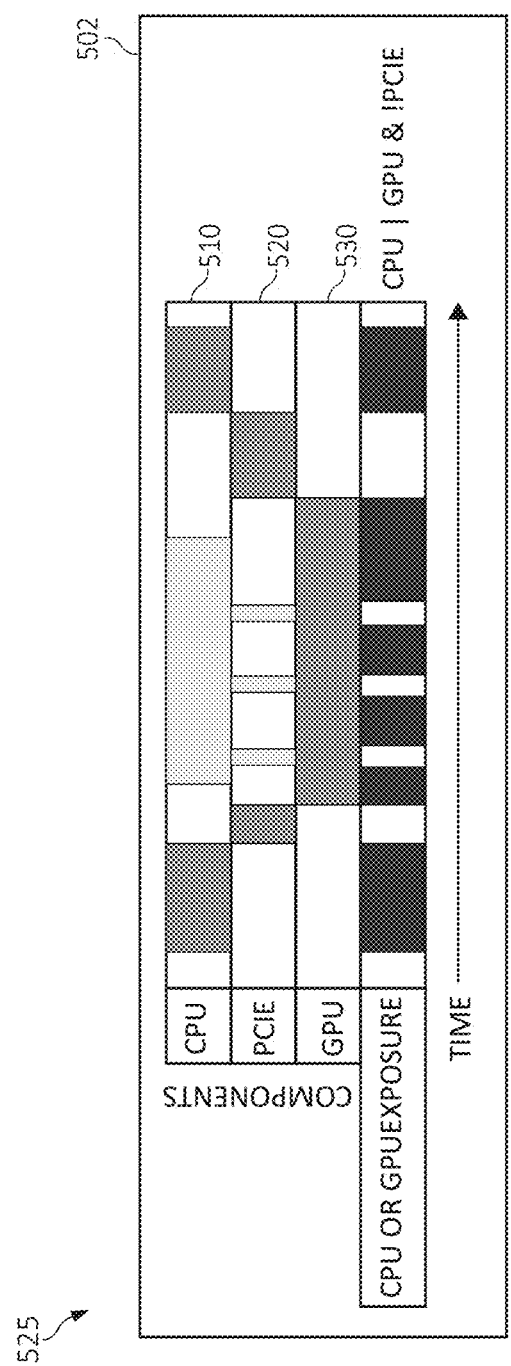

Continuing on, as depicted in FIG. 5C, a user may also define the user's own compound component expression. For example, a user may be interested in a potential/possible effect of improving the CPU and GPU performance (e.g., CPU or GPU exposure). The time when a compound component is active may represents an upper bound of how much application performance may be improved by only improving the performance of the exposed components.

Figure 5D:
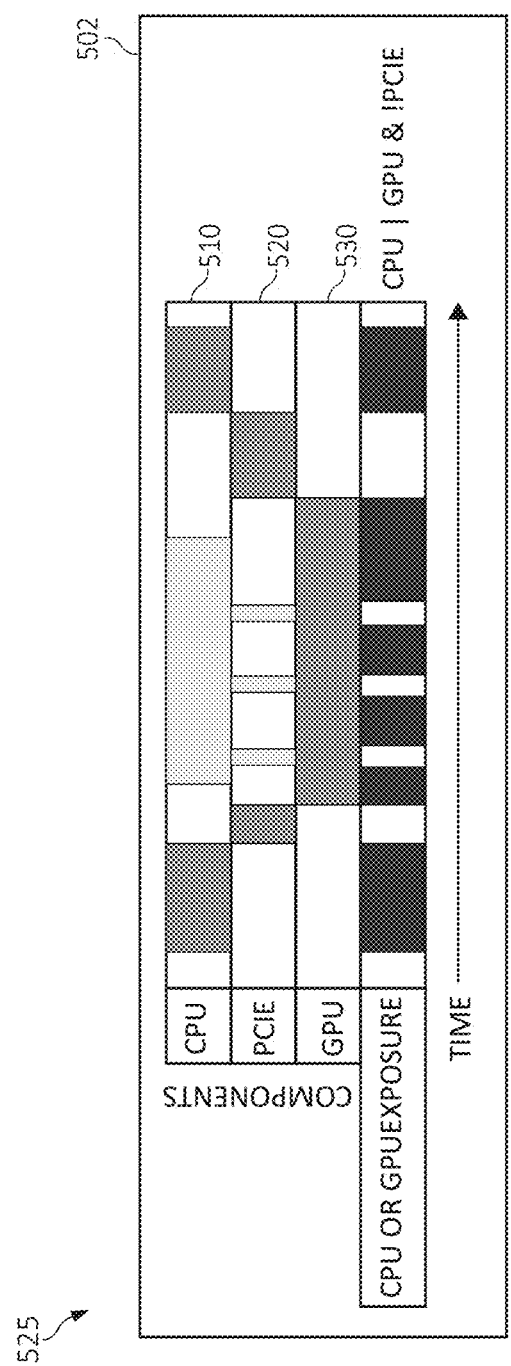

A performance summary may be provided as in FIG. 5D. That is, a quantitative summary of the compound component may be generated. For example: "60% of the program time is represented by only the CPU or GPU being utilized" or "the CPU or GPU is being utilized for 10 seconds (s)".

Figure 6A:
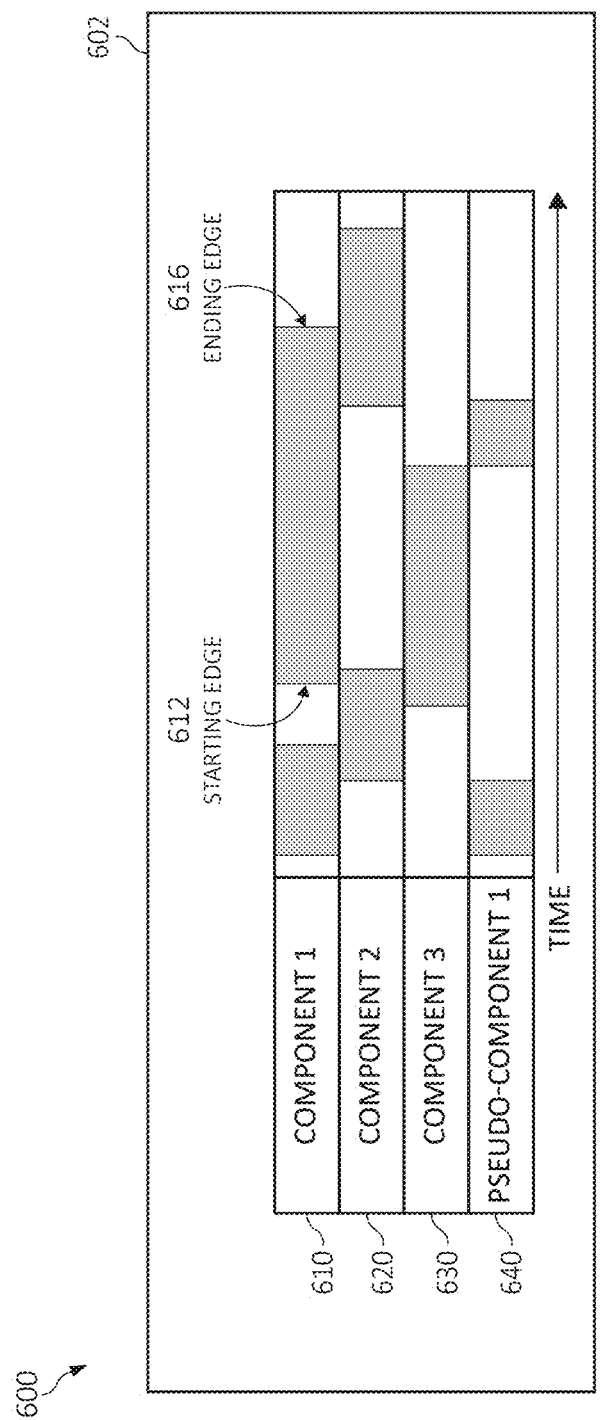
FIGS. 6A-6C are block diagram depicting additional exemplary operations for providing critical path analysis of active trace files in a computing environment in which aspects of the present invention may be realized.
Figure 6B:
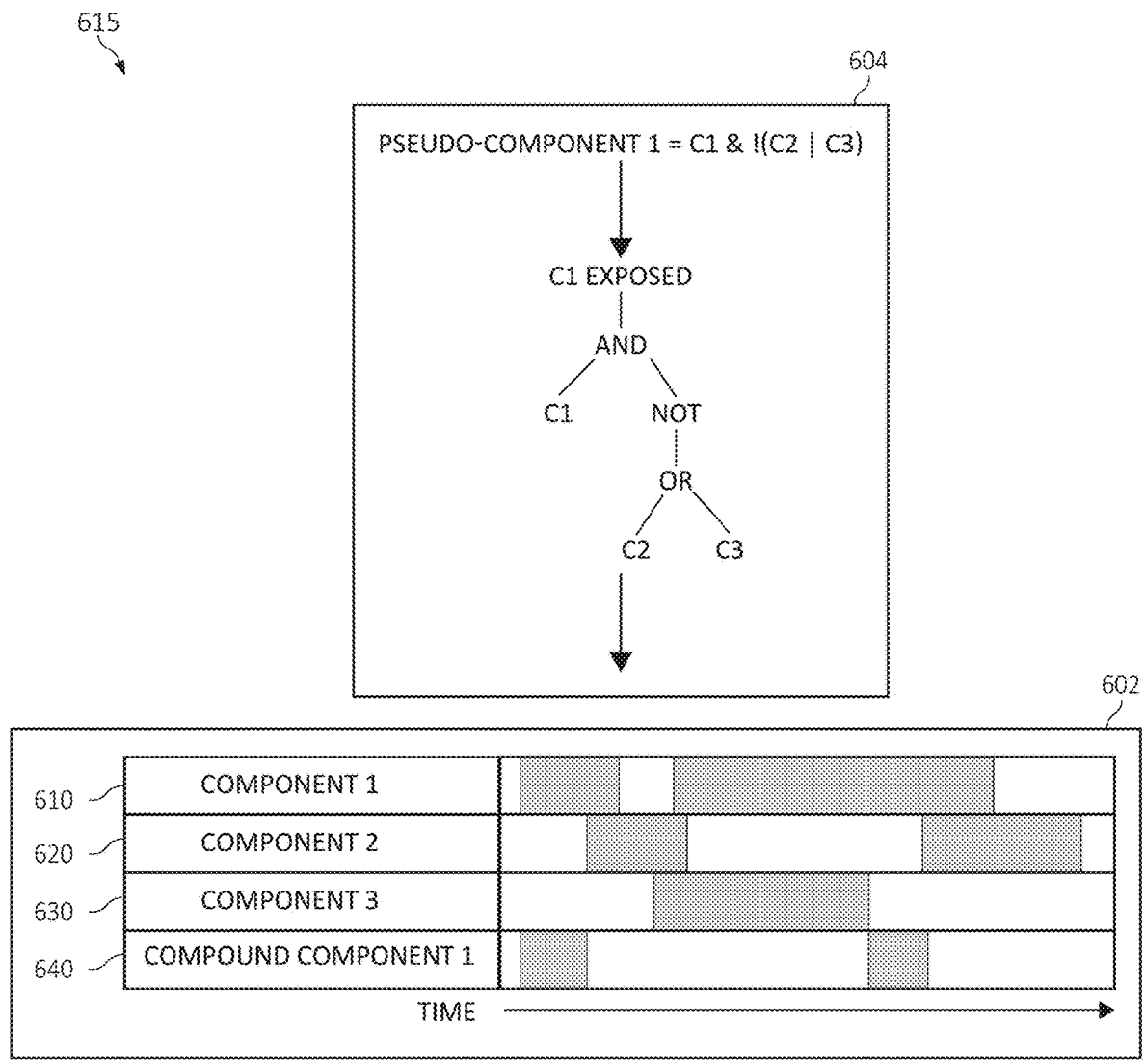
Figure 6C:
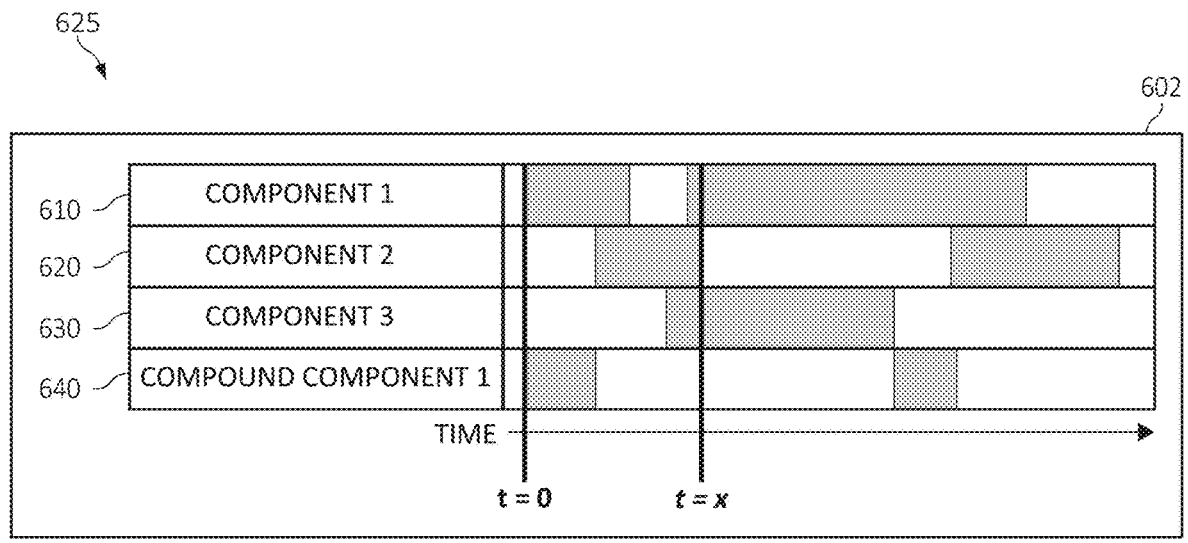
Figure 6C:
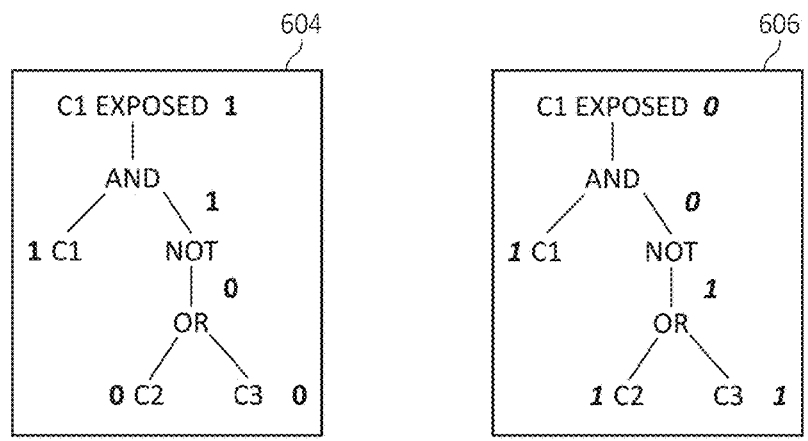

Turning now to FIGS. 6A-6C, depicts operations 600, 615, and 625 for providing critical path analysis of active trace files. It should be noted that the descriptions and embodiments of FIGS. 1-5A-5D can be used in FIG. 6A-6C. Repetitive description of like elements employed in other embodiments described herein is omitted for sake of brevity.

Turning now to FIG. 6A, as depicted in block 602, a program trace may be generated, which may include a set of time spans for abstract program components such as, for example, components 610, 620, and 630. Each time span may include a starting timestamp (e.g., a starting edge) and an ending timestamp (e.g., an ending edge) and may correspond to an "activity" for one of the components. A program trace may be generated for a particular program under test ("PUT") by: 1) writing the program trace to emit time spans corresponding to different program components of interest, 2) using an external profiling tool to record observable activities, such as CPU or GPU utilization or interconnect bandwidth.

As depicted in block 604, one or more compound components (e.g., C1 representing component 610, C2 representing component 620, and C3 representing component 630) may be generated. The compound components for specific profiling or performance task may be provided by a user as an expression (e.g., represented as Boolean expressions). Internally, the compound components tool represents each compound component as an expression tree for a Boolean algebra expression, as depicted in FIG. 6B and labeled as compound component 1 (e.g., compound component 640).

As depicted in FIG. 6C, for evaluating the compound components, each compound component may be evaluated a selected time intervals such as, for example, at time t=0 or t=x. In one aspect, by way of example only, a "0" may represent inactive and "1" may represent active, where 0 and 1 are the two values allowed in an expression (e.g., a Boolean expression), which is now the compound components that are evaluated. The edges of the time spans may be consumed in temporal order. At each edge, a state of a component switches between 0 and 1, as depicted in blocks 604 (depicting t=0) and 606 (depicted t=x). At each edge, any user defined compound components ("UDC" such as, for example, C1, C2, and/or C3) using that span may be re-evaluated. The result of the UDCs may be visualized and/or quantitatively summarized. To summarize the accumulated exposed time for a particular UDC (representing the optimization opportunity), a fixed amount of storage is needed for each UDC. To visualize, an amount of storage linear in the number of spans may be required.

To further illustrate, consider each component 610, 620, and 630 representing an activity and the compound component 640 representing an activity on the critical path. Each activity record in the trace file has a start and end time. Each record also is associated with a particular kind of activity. The state of each activity of interest (e.g., idle or active) may be tracked. At the starting edge of a record, a corresponding activity may be marked as active, and at the ending edge of a record, the activity may be marked as inactive. Record edges may be consumed in order of timestamp. Combined activity states may be expressed as Boolean expressions of these base activity states with the logic expression of "INV, OR, and AND operators, as depicted in blocks 604 and 606. For example, if state2=state1 AND state0, then state2 is active if state0 and state1 are active. For OR, state2 is active if state0 or state1 is active. For state2=NOT state1, state2 is active if state1 is not active.

Parent nodes in the expression may be updated when their child nodes changes state. Then, whether or not an activity is on the critical path is essentially the expression, as indicated in formula/expression (1):

on=activity

INV(otheractivity vs. otheractivity vs. . . . ), (1),

This expression may be established for any selected activity (e.g., an activity or component in question). The total memory used by the present invention scales with the types of activities to track, and not the number of records in the trace, allowing large traces to be processed.

Figure 7:
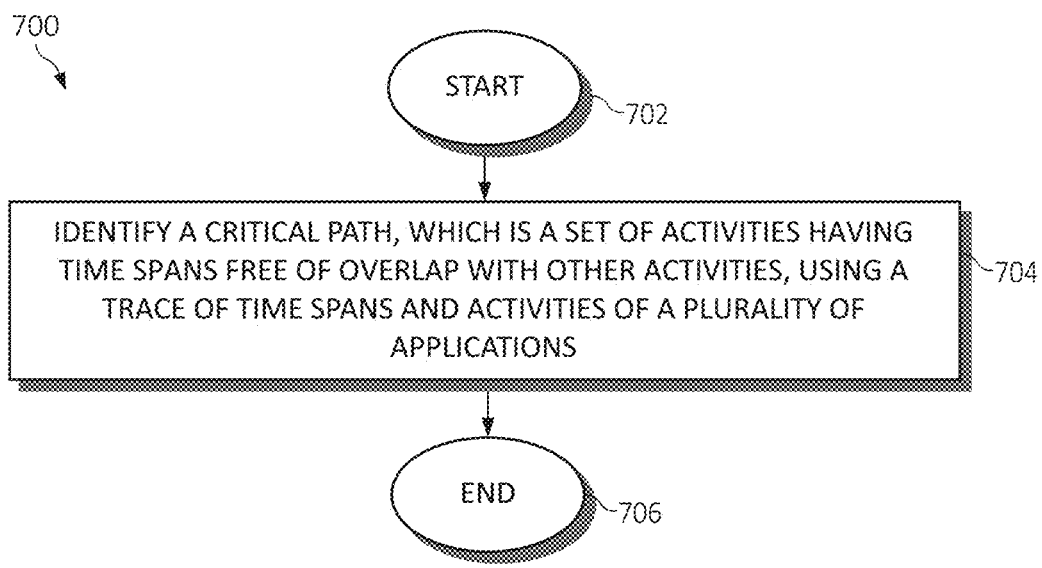
FIG. 7 is a flowchart diagram depicting an exemplary method for providing critical path analysis of active trace files in a computing environment, again in which various aspects of the present invention may be realized.

Turning now to FIG. 7, a method 700 for providing critical path analysis of active trace files in a computing environment is depicted. In one aspect, each of the devices, components, modules, operations, and/or functions described in FIGS. 1-6A-6C also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

A critical path, which is a set of activities having time spans free of overlap with other activities, may be identified using a trace of time spans and activities of a plurality of applications, as in block 704. The functionality 700 may end, as in block 706.

In one aspect, in conjunction with and/or as part of at least one block of FIG. 7, the operations of method 700 may include each of the following. The operations of method 700 may determine one or more critical paths of each operation and analyze a timeline of each of the activities to determine those of the set on activities on the critical path an awareness of event dependencies.

The operations of method 700 may trace and record the time spans and the activities of the plurality of applications.

That is, the operations of method 700 may record one or more overlapping time spans of one or more of the plurality of applications, wherein the recording is triggered upon observing one or more of the plurality of applications, executing one or more of the plurality of applications, simulating the activities relating to the plurality of applications, or a combination thereof.

The operations of method 700 may identify and mark a start time and an end time of each of the activities of the plurality of applications, wherein the start time indicates an active state and the end time indicates an inactive state of each of the activities, and track each of the time spans of the activities identified as having an active state at each time step to identify those of the activities on the critical paths.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing critical path analysis of active trace files in a computing environment, comprising:
    identifying a critical path using a trace of time spans and activities of a plurality of applications, wherein the critical path is a set of activities having time spans free of overlap with other activities, and wherein the activities to track are predefined prior to the trace such that a total memory used in performing the trace scales commensurate with the predefined activities in lieu of a number of records in the trace.

2. The method of claim 1, further including determining one or more critical paths of each operation.

3. The method of claim 1, further including analyzing a timeline of each of the activities to determine those of the set of activities on the critical path an awareness of event dependencies.

4. The method of claim 1, further including tracing and recording the time spans and the activities of the plurality of applications.

5. The method of claim 1, further including recording one or more overlapping time spans of one or more of the plurality of applications, wherein the recording is triggered upon observing one or more of the plurality of applications, executing of one or more of the plurality of applications, simulating the activities relating to the plurality of applications, or a combination thereof.

6. The method of claim 1, further including identifying and marking a start time and an end time of each of the activities of the plurality of applications, wherein the start time indicates an active state and the end time indicates an inactive state of each of the activities.

7. The method of claim 1, further including tracking each of the time spans of the activities identified as having an active state at each time step to identify those of the activities on the critical path.

8. A system for providing critical path analysis of active trace files in a computing environment, comprising:
    one or more computers with executable instructions that when executed cause the system to:
        identify a critical path using a trace of time spans and activities of a plurality of applications, wherein the critical path is a set of activities having time spans free of overlap with other activities, and wherein the activities to track are predefined prior to the trace such that a total memory used in performing the trace scales commensurate with the predefined activities in lieu of a number of records in the trace.

9. The system of claim 8, wherein the executable instructions that when executed cause the system to determine one or more critical paths of each operation.

10. The system of claim 8, wherein the executable instructions that when executed cause the system to analyze a timeline of each of the activities to determine those of the set on activities on the critical path an awareness of event dependencies.

11. The system of claim 8, wherein the executable instructions that when executed cause the system to trace and record the time spans and the activities of the plurality of applications.

12. The system of claim 8, wherein the executable instructions that when executed cause the system to record one or more overlapping time spans of one or more of the plurality of applications, wherein the recording is triggered upon observing one or more of the plurality of applications, executing of one or more of the plurality of applications, simulating the activities relating to the plurality of applications, or a combination thereof.

13. The system of claim 8 wherein the executable instructions that when executed cause the system to identify and mark a start time and an end time of each of the activities of the plurality of applications, wherein the start time indicates an active state and the end time indicates an inactive state of each of the activities.

14. The system of claim 8, wherein the executable instructions that when executed cause the system to track each of the time spans of the activities identified as having an active state at each time step to identify those of the activities on the critical paths.

15. A computer program product for, by a processor, providing critical path analysis of active trace files in a computing environment, the computer program product comprising a non-transitory computer-readable storage medium having computer-readable program code portions stored therein, the computer-readable program code portions comprising:
    an executable portion that identifies a critical path using a trace of time spans and activities of a plurality of applications, wherein the critical path is a set of activities having time spans free of overlap with other activities, and wherein the activities to track are predefined prior to the trace such that a total memory used in performing the trace scales commensurate with the predefined activities in lieu of a number of records in the trace.

16. The computer program product of claim 15, further including an executable portion that determines one or more critical paths of each operation.

17. The computer program product of claim 15, further including an executable portion that analyzes a timeline of each of the activities to determine those of the set on activities on the critical path an awareness of event dependencies.

18. The computer program product of claim 15, further including an executable portion that traces and records the time spans and the activities of the plurality of applications.

19. The computer program product of claim 15, further including an executable portion that records one or more overlapping time spans of one or more of the plurality of applications, wherein the recording is triggered upon observing one or more of the plurality of applications, executing of one or more of the plurality of applications, simulating the activities relating to the plurality of applications, or a combination thereof.

20. The computer program product of claim 15, further including an executable portion that:
    identifies and marks a start time and an end time of each of the activities of the plurality of applications, wherein the start time indicates an active state and the end time indicates an inactive state of each of the activities; and
    tracks each of the time spans of the activities identified as having the active state at each time step to identify those of the activities on the critical paths.

* * * * *